United States Patent Office 3,471,336
Patented Oct. 7, 1969

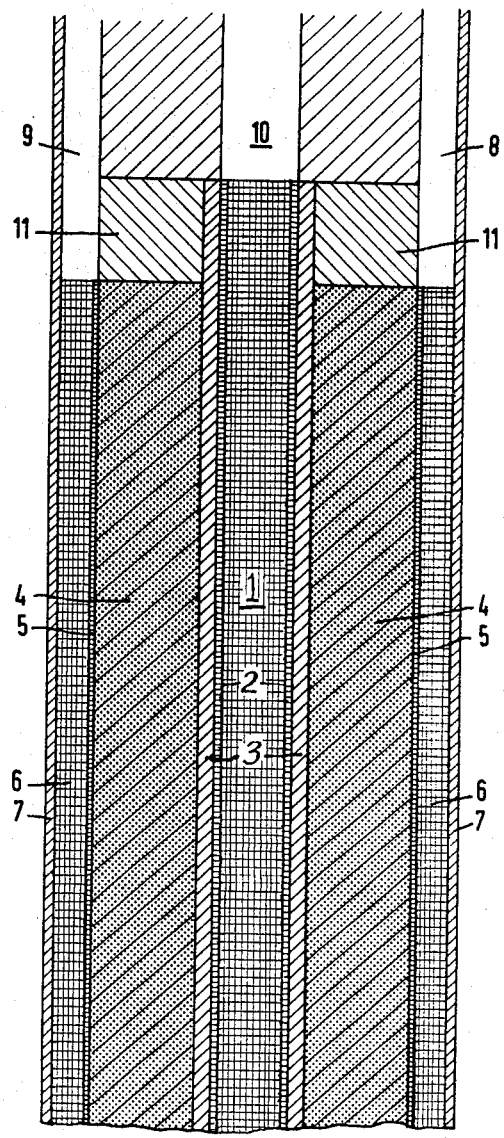

3,471,336
ELECTROCHEMICAL CELL
Ferdinand v. Sturm, Herbert Nischik, and Erhard Wiedlich, Erlangen, Germany, assignors to Siemens Aktiengesellschaft, a corporation of Germany
Filed Jan. 18, 1966, Ser. No. 521,297
Claims priority, application Germany, Jan. 19, 1965,
S 95,065
Int. Cl. H01m 27/02
U.S. Cl. 136—86                12 Claims

ABSTRACT OF THE DISCLOSURE

An electrochemical cell including a flexible plate member having a relatively coarse porous supporting structure and a cover layer in face-to-face contact with the structure on at least one side thereof. The cover layer is of relatively fine porous construction; and aqueous electrolyte impregnates the supporting structure. The cover layer is gas-tight and ion conducting in contact with the electrolyte.

---

Our invention relates to electrochemical cells, particularly fuel cells, operating with aqueous electrolytes and possessing thin electrodes of 1 micron to 1 mm. thickness.

The use of thin electrodes in such cells affords largely preventing the occurrence of concentration polarizations always observed with thick electrodes. Such polarizations are caused in the gas-filled pores by depletion of the reacting gas, and in the electrolyte-filled pores by changes in concentration as may result from dilution by water evolving from the reaction. Very thin electrodes, however, have only slight mechanical strength and can neither be mounted in conventional holding devices nor be subjected to conventional operating pressures.

Electrolytic cells have therefore been built in which the electrodes are disposed on the two sides of a diaphragm consisting for example of a flexible ion exchanger and simultaneously serving as a solid electrolyte. Ion exchange resins, as a rule, contain hydration water which may be driven out excessively when operating at elevated temperature with dry gases, particularly air. The ensuing drying of the resin may lead to interruption of the current flow in the cell and, ultimately, to destruction of the diaphragm.

In other devices the electrodes are braced against a rigid MgO skeleton containing a molten electrolyte. This requires operating at temperatures of 500 to 700° C. at which the skeleton has been found to become damaged by fissures or cracks. More recently, therefore, this type of structure has been discarded in favor of pastes composed of MgO and molten electrolyte. These pastes, however, are not suitable as an abutment for bracing very thin electrodes against the gas pressures employed so as to provide for sufficient mechanical strength of the electrodes.

Also proposed have been pulverulent electrodes in which the powder is held between screens. These catalyzer-screen electrodes, when operated as gas electrodes in fuel cells or the like, leave much to be desired, because the gas will bubble into the electrolyte already at a slight increase in pressure above the rated operating value, thus causing the necessary three-phase boundary to vanish.

It has been further proposed, therefore, to support thin electrodes by a porous skeleton structure impregnated with an electrolyte and having a reduced pore radius in the region adjacent to the electrodes. A fuel cell with such an electrode assembly is illustrated and described in the copending application of F. von Sturm et al. for Electrochemical Cells, Ser. No. 300,333, filed Aug. 6, 1963, now abandoned, assigned to the assignee of the present invention.

As will be explained hereinafter, our present invention may be looked upon as an improvement over cells of the type disclosed in the copending application. It will be helpful or necessary, therefore, to first deal with cells according to the copending application more in detail, before describing the improvement features of the present invention.

According to the copending application, the impregnation of the supporting skeleton structure with electrolyte liquid is effected by external pressure or by capillary pressure. Since the operating temperatures of the cell are below 200° C., a wide choice of electrolytes is available so that the ion conductance required for the electrolyte is not limited to only one ion type as with solid electrolytes, nor to a narrowly limited range of ions as with molten electrolytes.

Fine screens or sheets of wire mesh may be employed as electrodes, the wire consisting of catalytically active material. Also suitable are mesh or screen structures and carbon plates upon which the highly active catalyst material is deposited. The desired thin electrodes may also be produced by sintering or pressing of pulverulent material such as Raney-nickel, silver, Raney-silver, catalyst-impregnated carbon or DSK-material. Further suitable are electron-conductive, hydrogen-permeable thin foils which must be supported because of their mechanical instability. Thin electrodes are also obtained by metallizing the supporting skeleton structure. The metallic coating may be produced by known methods, for example by vapor deposition or current-less metallization, the latter method being particularly well suitable for depositing silver, gold and other noble metals. Other catalytically active materials may be deposited on top of the metallic coating, for example by electrolytic deposition.

The reaction gases may be supplied to the cell under superatmospheric pressure. When the pressure in the electrolyte reservoir is equal to atmospheric pressure, the gas pressure in the cell is limited by the capillary pressure of the electrolyte in the supporting skeleton structure. When the pressure is increased, gas bubbles into the skeleton structure and destroys at these localities the three-phase boundary between electrode, electrolyte and gas. Such disturbance or damage can be prevented by placing the electrolyte under pressure, for example under the pressure of one of the two reaction gases by providing for an external pressure coupling between gas space and electrolyte space of the cell.

A penetration of one of the gases into the supporting matrix skeleton structure, the electrolyte volume being enclosed, occurs only if the difference between the gas pressures increases beyond the capillary pressure in the skeleton structure, that is, when the following relation applies:

$$\left| P_1 - P_2 \right| > \frac{2\sigma}{r}$$

In this relation, $P_1$ denotes the pressure of the fuel gas, for example hydrogen. $P_2$ denotes the oxidant gas pressure, for example oxygen $\sigma$ the surface tension of the electrolyte (assuming that the supporting skeleton material is completely wettable by the electrolyte), and $r$ denotes the pore radius in the skeleton structure. In a cell according to the copending application, therefore, the permissible pressure difference $P_1-P_2$ can be increased if the pore radius $r$ is reduced at least in the region adjacent to the electrodes. Thus, the middle region of the supporting skeleton structure has coarse pores of 0.05 to 2 mm. width, in contrast to the outer region whose fine pores of reduced diameter have a width of only 0.0002 to 0.08 mm.

Now, according to the present invention, we have discovered that electrolytical cells, particularly fuel cells, of the type described in the foregoing with reference to the above-mentioned copending application, are amenable to considerable further improvement.

More particularly, it is an object of the present invention to further minimize the danger of gas penetrating from the gas space of the cell electrode into the electrolyte-impregnated supporting skeleton structure.

Another object is to provide a device which permits selecting a suitable or desired gas pressure for adjusting the three-phase boundary for each of the two electrodes independently of the other.

To achieve these objects, and in accordance with our invention, the active electrode of the electrochemical cell is essentially formed by pulverulent catalyst material which is pressed against a supporting porous skeleton structure by means of a sheet member, such as a meshwork or screen, of electrically good conducting material. According to another essential feature of the invention, the supporting skeleton structure in such a cell assembly is flexible and comprises, at least on one side, a cover layer which is gas tight and ion conducting in the impregnated condition of the skeleton structure.

In this specification, a "screen" is intended to denote a layer or sheet which is permeable only perpendicularly to its surface area. A meshwork of the type here referred to, however, is permeable perpendicularly to its surface area as well as parallel thereto.

The pulverulent catalyst material of a pulverulent electrode according to the invention is to be of such kind that it is not destroyed nor deprived of its catalytic properties by the electrolyte or the particular reaction gas. This pulverulent catalyst material may consist, for example, of Raney-nickel, silver, Raney-silver, DSK-material or catalyst-impregnated carbon such as platinum-coated soot or silver-coated active carbon. The grain size of the powder being employed may be in the range of 0.5 to 200 microns. The powder granules must be thicker than the pore width of the screen or other gas-permeable sheet member which holds the powder electrode together but should be as thin as feasible in order to provide for largest possible active localities. The pore diameter in the electrode, determined by the grain size, is downwardly limited by the pore diameter of the adjacent cover layer. This is because, only if the pores in the electrode are coarser than the pores in the cover layer, is it possible to adjust a three-phase boundary by applying a suitable gas pressure in the active region. In this respect, good results have been obtained with grain sizes between 5 and 100 micron.

The catalyst powder may be partially wetted with electrolyte so as to form a sludge. When preparing an electrode, the powder or sludge is pressed by means of a meshwork and/or screen against the supporting porous skeleton structure. This is done, for example, by uniformly distributing the catalyst powder upon a screen, for example in a distribution of 0.05 to 1 g. per cm.². Thereafter the supporting skeleton structure with the cover layer is placed upon the powder layer. Thereafter the screen and the supporting skeleton structure are pressed together with the aid of screw bolts. Depending upon the type of the catalyst powder being employed, layer thicknesses between 1 micron and 1 millimeter have been found sufficient.

While the meshwork or screen used for pressing the catalyst powder against the supporting structure is to be electrically good conducting, no exacting requirements are to be met by the electrical conductivity of the catalyst powder itself. For example, the powder may be one hundred times less electronically conductive than the meshwork or screen. Suitable for the latter are electronically good conducting materials which are not attacked by the particular reaction gas, nor by the electrolyte in the event of flooding by electrolyte. Suitable among others are nickel, platinum, silver, tantalum and titanium.

A fuel cell is usually enclosed by a sheet-metal shell or can, a spacer being provided between the enclosure and the electrode. Suitable as such a spacer is a second (outer) meshwork placed upon the above-described (inner) meshwork or other gas permeable sheet member that holds the catalyst powder against the supporting skeleton structure of the electrode. The second or outer meshwork may be made of any desired, for example electronically conducting material which is resistant to the operating conditions of the cell, and may have a mesh width and thickness larger by a multiple than the corresponding dimensions of the inner meshwork or screen. The outer mesh may be composed of two layers of respectively different thickness and mesh width, the one having the narrower mesh openings being adjacent to the inner meshwork or other sheet member. The outer meshwork supports and braces the inner one, and it also provides vacant spaces in its mesh openings for supplying reaction gas to the powder electrode. This outer meshwork therefore must be readily permeable to gas in directions parallel to the electrode surface as well as perpendicular thereto. Furthermore, the outer meshwork, if it consists of electrically conducting material, may be used for conducting electric current to the outside of the cell.

The invention will be further described with reference to an embodiment of a fuel cell according to the invention illustrated by way of example on the accompanying drawing.

The single illustration of the drawing shows a partial view of a cell in section.

Located in the middle of the cell is a stratified supporting skeleton structure impregnated with electrolyte. The skeleton structure comprises a middle layer 1 with coarse pores which is constituted by a nickel wire mesh of 1.15 mm. thickness whose mesh openings are 1.5 mm. wide, the nickel wire having a thickness of 0.5 mm. The thick nickel mesh 1 is borded on both sides by finely pored wire mesh 2 of nickel having a wire thickness of 0.05 mm., a total thickness of 0.13 mm. and mesh openings of 0.065 mm. width. Placed upon each side of the three-layer arrangement is a cover layer 3 having a thickness of 0.3 mm. and a pore width of about 1 micron.

Located on both sides of the plate-shaped supporting structure are flat plate-shaped masses 4 of catalyst powder. One of these two masses consists of Raney-nickel to form the anode. The other mass of powder consists of Raney-silver to form the cathode. The poured-in quantities of powder are held in position by a fine wire mesh 5 of nickel having a thickness of 0.09 mm., an opening width of 0.037 mm. and a wire diameter of 0.05 mm. This nickel layer mesh serves to hold the powder as well as electrically contacting it. Each wire mesh 5 is bordered by a coarse meshwork 6 likewise consisting of nickel and having a thickness of about 0.6 mm., a mesh-opening width of about 0.5 mm. and a wire thickness of 0.3 mm. The outer enclosure of the cell is formed by a sheet-metal can 7 consisting likewise of nickel and having a thickness of about 0.2 mm.

The stratified cell arrangement is placed under compression from the outside. Fuel gas and oxidant gas are supplied through channels 8 and 9 and pass into the gas spaces formed by and within the meshes 6. Located at 10 is a supply or discharging duct for the electrolyte. Denoted by 11 are holders for the powder quantities 4. The illustrated and above-described cell corresponds to one employed in practice with good results.

The illustrated embodiment is equipped with cover layers 3 on both sides of the skeleton plate structure. If a gas-tight cover layer is provided on only one side of the supporting skeleton structure, the electrolyte space must be subjected to the pressure of the skeleton side not carrying the cover layer. If, as shown, two cover layers are provided on opposite sides of the skeleton structure, the possibilities of varying the gas pressure and the electrolyte pressure are limited only by the mechanical strength and by the capillary pressure of the gas-tight cover layers.

The gas-tight cover layers are not completely impervious. They rather possess pores with diameters between 0.2 and 80 microns which during operation are filled at least partly with electrolyte liquid. It is only by virtue of the electrolyte held fast by capillary forces that the cover layers become gas tight and ion conducting. Aside from being gas tight, the cover layer must possess a high ion conductivity in order to keep the potential drop in the electrolyte small. The corresponding ion resistance per cm.$^2$ of the cover layer, for example in cells operating with current densities above 10 ma./cm.$^2$, is preferably smaller than 5 ohm.

For increasing the ion conductivity the cover layers are made very thin. On the other hand, between its supported points the cover layer is to be sufficiently stable to withstand the pressure of the gas or the electrolyte. For these reasons, it has been found preferable to give the cover layers a thickness between 0.02 and 1 mm.

The selection of the cover layer material must take into account that these layers are to be resistant to the particular reaction gas in the electrode as well as to the particular electrolyte being employed, and that they should be flexible in order to prevent them from breaking or cracking when the cells are being assembled. Suitable cover layers for example consist of non-metallic sheets such as inorganic webs or fabrics of asbestos or glass fiber, also asbestos paper or glass fiber paper, foils of cellulose and derivatives thereof. Also applicable are porous metal foils, for example those of nickel. This is permissible particularly if the supporting skeleton structure upon which the cover-layer foil is placed, is electronically non-conducting. If the cover layer as well as the supporting skeleton structure are electronically conducting, a short circuit from electrode to electrode must be prevented by providing an electronically non-conducting layer between cover layer and supporting structure or within the supporting structure, for example between two of its layers if the structure is composed of several layers.

The best suitable combination of catalyst powder and cover layer depends upon the type of the reaction gas, the electrolyte (which may be acidic or alkaline, an aqueous solution or an aqueous melt) and upon the operating temperature of the electrolyte.

As a rule, the operating temperature of a cell according to the invention is in the approximate range from −30° to +200° C. and depends upon the type of cell and the reaction partners. High degrees of efficiency for the conversion of hydrogen into electricity are achieved already at operating temperatures between 10 and 100° C.

Suitable as electrolyte for electrodes according to the invention are acidic or alkaline electrolyte liquids, depending upon the materials of the electrode and the supporting structure. The electrolyte may consist of an aqueous solution or a water-containing melt of NaOH or KOH, for example.

The supporting structure in an electrochemical cell according to the invention, in which structure the electrolyte is contained, affords not only a circulation of the electrolyte through the cell but also the flow of ion current from electrode to electrode. The supporting structure therefore is permeable in two dimensions. Since the supporting structure, aside from guiding the electrolyte and forming a spacer between the electrodes, serves no further purposes, this structure may be made of any desired meshlike material, as long as the material is resistant to the electrolyte and any perhaps entering reaction gas.

The supporting skeleton structure without the cover layers may possess uniform pores of uniform distribution throughout. However, it may also be composed of layers, for example three layers of which the middle layer has coarser pores than the two outer ones. The coarsely pored layer then provides for electrolyte circulation through the cell, whereas the finely pored region provides the assurance that the cover layer will not be pressed into the coarsely pored layer and be damaged thereby. The merger from coarse pores to fine pore region may be continuous or discontinuous, and the entire skeleton structure may be composed of respective layers having different pores. The supporting skeleton structure may be made of uniform or different materials, especially of nickel mesh material. Also suitable as skeleton structure material is synthetic plastic, for example polyethylene, polypropylene or Teflon (polytetrafluoroethylene).

The pore diameter or the diameter of the mesh openings in the supporting structure may be chosen between approximately .05 and 2 mm. The larger dimensions apply to a coarse-pore middle layer of the supporting structure if such a layer is used. If the meshes in the supporting structure are everywhere the same, then the mesh openings have a diameter generally amounting to a maximum of about 1 mm.

Since in a cell according to the invention the supporting structure, as well as the cover layer, is flexible, the powder electrode held in position by a meshwork or screen is also flexible. This is an essential advantage because it prevents the supporting structure from being broken or cracked when assembling the cell or a complete cell battery. This flexibility of an electrochemical cell and of its components according to the invention thus constitutes a significant distinction from the cells and cell components heretofore known.

In contrast to known rigid electrodes (carbon plates, sintered or hot-pressed metal electrodes) the design principle embodied in devices according to the invention affords the novel possibility of producing very large electrodes by a simple method. In principle, the area of the electrode is limited only inasmuch as it becomes more difficult with an increase in size to uniformly supply the reaction gases to all points of this area and to dissipate the resulting heat losses. Nevertheless, the area may be made larger than one square meter, and its shape may be chosen at will. If large batteries are to be composed, the better space-filling factor makes it advisable to use rectangular electrode shapes. For producing a small series of cells, when it does not pay to use mass-production equipment, for example punch presses, it is preferable to employ circular electrodes whose rigid components, for example the frame, can be more simply cut on a lathe.

Further details will be described in the following examples with reference to the fuel cell illustrated on the drawing and described in the foregoing.

EXAMPLE 1

The oxidant electrode is operated with atmospheric oxygen. Used as electrolyte was 6 m. KOH at 10 to 60° C.

Powder electrode: 0.2 g./cm.$^2$ active carbon coated with silver, grain size $<60\mu$.

Cover layer: asbestos paper 0.3 mm. thick.

At an air pressure of 0.3 atmospheres (superatmospheric) a constant loadability of the cell was measured during a period of several months (50 ma./cm.$^2$ at 60° C. and 200 mv. polarization).

EXAMPLE 2

Electrode for conversion of $CO_2$-$H_2$ mixture operating at 40 to 80° C.

Electrolyte: 30% $H_2SO_4$.

In this case an alkaline electrolyte is unsuitable because it would be converted to a carbonate by the $CO_2$ content of the gas mixture.

Powder electrode: 0.2 g./cm.$^2$ soot coated with platinum (2%).

Cover layer: glass-fiber paper of 0.1 mm. thickness.

Measured was a good loadability at small over-voltages (100 ma./cm.$^2$ at 80° C. and 100 mv. polarization).

EXAMPLE 3

Hydrogen electrode

Electrolyte: 5 m. KOH, 60°–80° C.

Powder electrode: 0.4 g./cm.$^2$ Raney-nickel of 50–100$\mu$ grain size.

Cover layer: asbestos paper 0.3 mm. thick.

Measured was a good loadability permitting a high overload for a short interval of time (80 ma./cm.$^2$ at 80° C. and 80 mv. polarization).

EXAMPLE 4

Propane electrode

Electrolyte: 20% $H_2SO_4$ (or 85% $H_3PO_4$), 100° C.

Powder electrode: platinized carbon powder (10% Pt), grain size 5 to 30$\mu$.

Cover layer: glass-fiber paper of 0.2 mm. thickness.

By the provision of the above-described supporting structure, an electrochemical cell according to the invention affords using very thin electrodes, which reduces the concentration polarization. The electrolyte sucked into the skeleton structure prevents the cell from drying out. Since the supporting structure itself can be made relatively thin, depending upon the pressure difference of the reaction gases, the total thickness of the cell can also be kept very small. The resulting saving in electrode material is tantamount to reducing the cost and weight of the cell. The simple and compact design of the cell further facilitates providing the circuit connections of individual cells to provide for multiple-cell batteries, as well as any desired exchange of individual cells within such comprehensive assemblies.

The above-described arrangement of the electrodes according to the invention is also applicable to advantage in electrolytic devices to which electric current is supplied from the outside through the members 6 for producing a desired electrochemical effect within the cell. By suitably adapting the pore sizes of supporting skeleton structure and electrodes, the resulting gases, namely hydrogen and oxygen, can be separately conducted out of the cell spaces 8, 9 located on opposite sides of the electrolyte.

Upon a study of this disclosure, such and other variations and modifications will be obvious to those skilled in the art and are indicative of the fact that our invention may be given embodiments other than particularly illustrated and described herein, without departing from the essential features of our invention and within the scope of the claims annexed hereto.

We claim:

1. An electrochemical cell, comprising a flexible plate member having a relatively coarse porous supporting structure and a cover layer in face-to-face contact with said supporting structure on at least one side thereof, said cover layer being of relatively fine porous construction; an aqueous electrolyte in said relatively coarse porous supporting structure and said cover layer, said aqueous electrolyte being retained in said cover layer by capillary forces to render said cover layer gas-tight and ion-conducting; two electrodes in area contact with said plate member on opposite sides thereof, at least one of said electrodes being formed of pulverulent catalyst material, and holding means for holding said pulverulent material pressed against said flexible plate member, said holding means comprising a gas-permeable sheet member of good conducting material adjacent said pulverulent material.

2. In an electrochemical cell according to claim 1, said electrode of pulverulent material containing a wetting quantity of electrolyte dispersed in the pulverulent material.

3. In an electrochemical cell according to claim 1, said cover layer consisting substantially of inorganic fiber material.

4. In an electrochemical cell according to claim 1, said cover layer consisting of asbestos paper.

5. In an electrochemical cell according to claim 1, said cover layer consisting of glass-fiber paper.

6. In an electrochemical cell according to claim 1, said cover layer consisting of a porous metal foil.

7. In an electrochemical cell according to claim 1, said cover layer consisting of a porous nickel foil.

8. In an electrochemical cell according to claim 1, said cover layer having a thickness between 0.02 and 1 mm. and being porous, the pored iameter being between 0.02 and 80 micron.

9. In an electrochemical cell according to claim 8, the pores of said cover layer being substantially filled with electrolyte liquid.

10. An electrochemical cell according to claim 1, comprising an outer gas-permeable sheet disposed on said sheet member in sandwich relation thereto and having coarser pores than said sheet member.

11. An electrochemical cell, comprising a flexible plate member having a porous supporting structure and a cover layer in face-to-face contact with said structure on at least one side thereof; an aqueous electrolyte impregnating said porous structure, said cover layer being gas-tight and ion conducting in said plate member on opposite sides thereof, at least one of said electrodes being formed of pulverulent catalyst material, holding means for holding said pulverulent material pressed against said flexible plate member, said holding means comprising a gas-permeable sheet member of good conducting material adjacent said pulverulent material, and an envelope into which said impregnated supporting structure with two said electrodes of pulverulent material and two said porous sheet members are inserted, said envelope having two gas chambers communicating with said electrodes through the pores of said respective sheet members.

12. An electrochemical cell, comprising a flexible plate member having a porous supporting structure and a cover layer in face-to-face contact with said structure on at least one side thereof; an aqueous electrolyte impregnating said porous structure, said cover layer being gas-tight and ion conducting in contact with said electrolyte; two electrodes in area contact with said plate member on opposite sides thereof, at least one of said electrodes being formed of pulverulent catalyst material, holding means for holding said pulverulent material pressed against said flexible plate member, said holding means comprising a gas-permeable sheet member of good conducting material adjacent said pulverulent material, and an envelope into which said impregnated supporting structure with two said electrodes of pulverulent material and two said porous sheet members are inserted, said envelope having two gas supply ducts for gaseous fuel and gaseous oxidant respectively, said two gas ducts communicating through the pores of said respective sheet members with said two electrodes of pulverulent material for operation of the cell as a fuel cell, and said porous members being formed of conductive material to conduct current through the electrodes for electrolysis operation of the cell.

References Cited

UNITED STATES PATENTS

| | | | |
|---|---|---|---|
| 3,061,658 | 10/1962 | Blackmer | 136—86 |
| 3,297,484 | 1/1967 | Niedrach | 136—86 |
| 3,382,105 | 5/1968 | McBryar et al. | 136—86 |

ALLEN B. CURTIS, Primary Examiner

PO-1050
(5/69)

UNITED STATES PATENT OFFICE
CERTIFICATE OF CORRECTION

Patent No. 3,471,336       Dated October 7, 1969

Inventor(s) Ferdinand v. Sturm et al

It is certified that error appears in the above-identified patent and that said Letters Patent are hereby corrected as shown below:

In the heading to the printed specification, line 3, "Wied-" should read -- Weid- --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents